US010060945B2

(12) United States Patent
Steurer et al.

(10) Patent No.: US 10,060,945 B2
(45) Date of Patent: Aug. 28, 2018

(54) DEVICE FOR CORRECTING A SPACING VALUE AND/OR FOR CORRECTING A RELATIVE SPEED VALUE, VEHICLE, AND METHOD

(71) Applicant: Conti Temic microelectronic GmbH, Nürnberg (DE)

(72) Inventors: Helmut Steurer, Junkenhofen/Geroisbach (DE); Armin Vogl, Obergriesbach (DE)

(73) Assignee: Conti Temic Microelectronic GmbH (DE)

( * ) Notice: Subject to any disclaimer, the term of this patent is extended or adjusted under 35 U.S.C. 154(b) by 0 days.

(21) Appl. No.: 15/119,520

(22) PCT Filed: Feb. 3, 2015

(86) PCT No.: PCT/DE2015/200058
§ 371 (c)(1),
(2) Date: Aug. 17, 2016

(87) PCT Pub. No.: WO2015/131887
PCT Pub. Date: Sep. 11, 2015

(65) Prior Publication Data
US 2017/0010302 A1    Jan. 12, 2017

(30) Foreign Application Priority Data

Mar. 5, 2014    (DE) .................. 10 2014 204 000

(51) Int. Cl.
*G01P 7/00*        (2006.01)
*G01S 11/12*       (2006.01)
(Continued)

(52) U.S. Cl.
CPC .......... *G01P 21/00* (2013.01); *B60R 21/0132* (2013.01); *G01C 3/08* (2013.01);
(Continued)

(58) Field of Classification Search
CPC ...... B60R 2021/01013; B60R 21/0132; G01C 3/08; G01P 21/00; G01P 7/00; G01S 11/12
See application file for complete search history.

(56) References Cited

U.S. PATENT DOCUMENTS 5,498,028 A * 3/1996 Carlin ................. B60R 21/0132
                                                    280/735
6,778,928 B2    8/2004 Stiller
(Continued)

FOREIGN PATENT DOCUMENTS

DE    19962997    6/2001
DE    10218228    11/2003
(Continued)

OTHER PUBLICATIONS

International Search Report and Written Opinion of the International Searching Authority for International Application No. PCT/DE2015/200058 dated May 21, 2015, 8 pages.
(Continued)

*Primary Examiner* — Charles J Han
(74) *Attorney, Agent, or Firm* — RatnerPrestia

(57) ABSTRACT

A device for increasing the precision of the distance and the relative velocity of a camera-based sensor with the aid of longitudinal acceleration for use in vehicles, e.g., in passive safety applications. In a first arithmetic unit of the inventive device, a correction of a slowly repeated camera-based measurement of the distance to an object is performed with the aid of an internal, longitudinal acceleration signal sampled at a much higher rate, wherein the inventive correction may be performed within an arithmetic unit of the camera, within a passive safety system or in a unit outside the camera and outside the safety system in the vehicle.

15 Claims, 2 Drawing Sheets

(51) Int. Cl.
  *G01P 21/00* (2006.01)
  *G01C 3/08* (2006.01)
  *B60R 21/0132* (2006.01)
  *B60R 21/01* (2006.01)

(52) U.S. Cl.
  CPC ............... *G01P 7/00* (2013.01); *G01S 11/12* (2013.01); *B60R 2021/01013* (2013.01)

(56) References Cited

U.S. PATENT DOCUMENTS

| | | | |
|---|---|---|---|
| 8,558,732 B2 | 10/2013 | Kuttenberger | |
| 2006/0289216 A1* | 12/2006 | Kato | B60T 7/22 180/169 |
| 2007/0035113 A1 | 2/2007 | Kuttenberger et al. | |
| 2008/0172156 A1* | 7/2008 | Joh | G01S 13/723 701/45 |
| 2010/0168957 A1 | 7/2010 | Takahashi | |
| 2013/0262020 A1 | 10/2013 | Boran | |
| 2014/0032078 A1* | 1/2014 | Seo | B60W 30/095 701/96 |
| 2015/0294453 A1 | 10/2015 | Nakano | |

FOREIGN PATENT DOCUMENTS

| | | |
|---|---|---|
| DE | 10323483 | 12/2004 |
| EP | 1636070 A1 | 3/2006 |
| JP | 2002059857 | 2/2002 |
| JP | 2006205773 | 8/2006 |
| JP | 2009220798 | 10/2009 |
| JP | 2012020733 | 2/2012 |
| WO | 2014003168 | 1/2014 |

OTHER PUBLICATIONS

German Examination Report for German Application No. 10 2014 204 000.0 dated Jul. 23, 2014, 6 pages.
European Examination Report for European Application No. 15 714 166.4, dated Oct. 31, 2017, 4 pages.
International Preliminary Report on Patentability and Written Opinion of the International Searching Authority for International Application No. PCT/DE2015/200058, dated Sep. 6, 2016, 7 pages.

* cited by examiner

DEVICE FOR CORRECTING A SPACING VALUE AND/OR FOR CORRECTING A RELATIVE SPEED VALUE, VEHICLE, AND METHOD

CROSS REFERENCE TO RELATED APPLICATIONS

This application is the U.S. National Phase Application of PCT International Application No. PCT/DE2015/200058, filed Feb. 3, 2015, which claims priority to German Patent Application No. 10 2014 204 000.0, filed Mar. 5, 2014, the contents of such application being incorporated by reference herein.

FIELD OF THE INVENTION

The present invention relates to distance and velocity determination in vehicles and relates to safety systems in vehicles. In particular, the present invention relates to a device for correcting a distance value and/or for correcting a relative-velocity value, a vehicle having a device and a method for correcting a distance value and/or a relative-velocity value.

BACKGROUND OF THE INVENTION

In order to be able to utilize distance and velocity information of an anticipatory surroundings sensor in the passive safety system (passive safety application), the surroundings sensor must provide these data sufficiently quickly and at the right time. Camera-based systems often do not operate sufficiently quickly due to their long processing times. Therefore, they may pose a safety risk due to their delay times, e.g., when restraint means in the vehicle are actuated. In particular, camera-based systems require a minimum number of frames for the determination of a reliable relative velocity. Usually, distance estimation is performed on the basis of two camera images, and the associated time period between these two frames is used to calculate the relative velocity between two vehicles.

Outdated information, however, cannot be used in the passive safety system. In particular, the data provided by a slow surroundings sensor are hardly usable in a passive safety system in a useful manner in the event of the most typical of all driver's reactions prior to an accident, which is emergency braking with a deceleration approximating gravitational acceleration (9.81 m/s$^2$).

SUMMARY OF THE INVENTION

Specifying an improved provision of a relative-velocity value and/or an improved provision of a distance value of a vehicle may be considered as an aspect of the invention.

The described exemplary embodiments equally relate to the device for correcting a distance value and/or for correcting a relative-velocity value, a vehicle having a device and a method. In other words, features described in the following with respect to the device may likewise be implemented in the vehicle and may be considered as corresponding features of the method. This also applies vice versa, of course. In particular, the device is designed to carry out the methods described in the following unless anything to the contrary is explicitly specified.

According to an exemplary embodiment of the invention, a device for correcting a distance value and/or for correcting a relative-velocity value for a vehicle is specified. The device has a first arithmetic unit. The first arithmetic unit is designed to correct a distance value of the vehicle relative to an object present in the surroundings of the vehicle and/or to correct a relative-velocity value $v_1$ of the vehicle relative to said object, said distance value and said relative-velocity value $v_1$ being determined by camera images. The first arithmetic unit is also designed to correct the distance value and/or to correct relative-velocity value $v_1$ depending on a proper-acceleration value a of the vehicle measured by an acceleration sensor.

As explicitly specified above, an aspect of the invention relates both to the correction of the distance value and, in combination therewith or as an alternative thereto, to the correction of relative-velocity value $v_1$. By means of the acceleration a of the vehicle, a correction velocity can be calculated by single time integration. This correction velocity may then be used to calculate the corrected relative velocity. On the other hand, double integration of acceleration a yields a correction distance that may be used to determine the corrected distance. Alternatively, it is also possible to calculate, on the basis of the path-time law and by means of the previously determined corrected velocity, the associated corrected distance value. The present invention comprises all these options. Since it is therefore only necessary to convert between the corrected distance value and the corrected relative-velocity value, various aspects of the invention will hereinafter be described in detail only with respect to the correction of relative velocity (relative-velocity value $v_1$) for reasons of clarity. These following disclosures equally apply to the distance value unless anything to the contrary is explicitly specified.

Since the distance and relative velocity may change rapidly between two camera-based measurements in particular driving situations due to accelerations/decelerations of the vehicle, the present invention takes advantage of representing the measuring results between two camera measurements more precisely by correcting the current velocity or the current distance by the acceleration sensor observation. For example, if one assumes that the time period between two camera measurements is 250 ms and, on the other hand, uses the information every 20 ms for a braking decision or every millisecond for the actuating decision in passive safety applications, it is very advantageous to use, e.g., the proper acceleration of the vehicle (acquired every millisecond or every 0.5 milliseconds) for correction. For example, relative velocity changes by 0.72 km/h at a deceleration of 1 g per 20 ms, and by up to 9 km/h in the time period of 250 ms between the camera measurements. This change is taken into account by the inventive device since a corresponding correction is performed. Therefore, the inventive device provides a current, corrected distance value and/or a current, corrected relative-velocity value after a first camera measurement until the next camera measurement, which can increase the safety of the users of the vehicle having this device.

To this end, the first and any other arithmetic unit mentioned herein may be designed, e.g., as a microprocessor or as a microcontroller in the context of the present invention, which microprocessor or microcontroller can perform the required arithmetic operation. The first arithmetic unit may be placed in various places in the vehicle. In particular, the first arithmetic unit may be part of the vehicle camera that generates the images on the basis of which the distance value of the vehicle relative to another object and/or the relative-velocity value $v_1$ of the vehicle relative to said object are/is determined. The first arithmetic unit may also be arranged outside the camera and as a separate structural unit of the device. The first arithmetic unit may also be part of a passive safety system. The first arithmetic unit may also be designed as a part of the acceleration sensor so that the inventive correction is performed within the acceleration sensor. The acceleration sensor itself may be part of the device. Details about this and further exemplary embodiments will be further explained in the following.

An arithmetic unit is also required for the generation of the (uncorrected) distances and relative velocities from the image data of the camera. In the context of the present invention, this arithmetic unit is referred to as the second arithmetic unit and will be further explained by reference to following exemplary embodiments. This arithmetic unit may be arranged within the camera system and have various designs. This arithmetic unit may be designed, e.g., as a programmable logic device. An example well-known to a person skilled in the art is a so-called application-specific integrated circuit (ASIC), or a system on a chip, such as Xilinx Zynq. Other examples are the Xilinx families Spartan, Artix, Virtex, and Kintex. Typical signal processors are ADSP218x and Blackfin BF53x by Analog Devices and TMS320VC5x by Texas Instruments. This arithmetic unit may also be designed as a field programmable gate array (FPGA), which represents an integrated circuit (IC) of digital technology into which a logic circuit is programmable. This arithmetic unit may also be designed as a digital signal processor (DSP) used for the continuous processing of digital signals by means of digital signal processing. Of course, the arithmetic unit may also have other designs.

In certain exemplary embodiments, the first arithmetic unit and the second arithmetic unit are one and the same arithmetic unit so that both the determination of the initial distance value and/or of the initial relative-velocity value $v_1$ and the correction of said values or the correction of one of said values are performed within this one arithmetic unit.

It is possible, by means of the inventive device, to achieve an increase in the precision of the distance and/or the relative velocity of a camera-based sensor with the aid of acceleration, which is very advantageous for use in passive safety systems in particular. However, the corrected values, the corrected distance value and/or the corrected relative-velocity value, may also be used for other applications in the vehicle that are no part of a passive safety system.

The inventive device takes advantage of the finding that an improved provision of the relative-velocity value can be achieved if the proper acceleration of the vehicle is detected with the aid of an acceleration sensor, e.g., a longitudinal-acceleration sensor. The acquired data are then used to correct the values of the detection system, which detection system might be sluggish in some circumstances. If desired, this correction may be performed only for a short time or only in particular situations in which certain criteria are met, wherein correction may be performed for the time period in which the camera-based system for the determination of relative velocity is expected to react too sluggishly. This time period may have different lengths, as will hereinafter be specified in detail by means of various exemplary embodiments. At least for accidents with stationary or non-accelerated targets, an essentially improved prediction of impact velocity and of the moment of impact to be expected can be achieved by means of the inventive device. In an exemplary embodiment, the device of the present invention is designed for such a prediction of impact velocity and of the moment of impact to be expected.

In an exemplary embodiment, the device uses the motion equation to anticipate the future motion of the vehicle that can be estimated by means of the currently measured acceleration of the vehicle.

With the aid of the comparatively precise acceleration sensor, a further, corrected piece of distance/relative-velocity information is generated that may then be used instead of the raw data of the camera-based system. The corrected values may be used, in particular, in passive safety systems, e.g., to predict accident severity, wherein proper-acceleration value a measured by the acceleration sensor of the vehicle is made available to the first arithmetic unit. For corresponding signal transmission, there are data lines or there may be a wireless communication link within the vehicle, wherein proper-acceleration value a may be positive or, in other cases, negative (deceleration).

On the whole, the inventive device may thus be used to correct a relatively slowly repeated camera-based measurement of the distance to an object with the aid of an internal acceleration signal sampled at a much higher rate.

According to a further exemplary embodiment of the invention, the first arithmetic unit is designed to calculate a velocity value $v_2$ in the form of a time integral from t=0 to $t_1$ of the measured proper-acceleration value a, $$\int_0^{t_1} a\, dt.$$

In other words, an integral is formed over acceleration in this exemplary embodiment, said integral containing the change in velocity from 0 to $t_1$, wherein $t_1$ is a positive time period, wherein instant $t_1$ may be selected such that, e.g., $t_1$ is smaller than the delay time of a fresh determination of the distance value and/or of the relative-velocity value $v_1$ in a new camera measurement. In particular, $t_1$ may be selected such that it is smaller than the so-called oversleep time of the camera, wherein the oversleep time is the time period between two consecutive camera images, which corresponds to the time period between two camera measurements (250 ms in the previous example). Other integration times are also possible, of course. For example, integration time $t_1$ may also be selected such that it is smaller than the overall time required for image generation by the camera and for the subsequent determination of the distance value and of the relative-velocity value $v_1$. In other words, time period $t_1$ may be smaller than the time required for, e.g., supplying a second updated relative-velocity value to a passive safety system. During these dead times of the camera-based system, the device of the present invention may perform one or more corrections of the relative-velocity value of the first determination on the basis of current data of the proper-acceleration value.

According to a further exemplary embodiment of the invention, the first arithmetic unit is designed to generate a corrected distance value and/or to generate a corrected relative-velocity value $v_3$, wherein $v_3=v_1-v_2$ for the corrected relative-velocity value $v_3$ generated by the first arithmetic unit if the measured proper-acceleration value a is negative and thus represents a deceleration, and $v_3=v_1+v_2$ if the measured proper-acceleration value a is positive.

In other words, the velocity calculated on the basis of the acceleration of the vehicle is subtracted by the first arithmetic unit if a deceleration is present, and the calculated velocity is added if an acceleration is present. Therefore, the calculated velocity represents a correction velocity.

According to a further exemplary embodiment of the invention, time $t_1$ is selected such that $t_1$ is smaller than a delay time required for the determination of the distance value and/or of the relative-velocity value $v_1$ by the camera images.

After the determination of the first relative-velocity value $v_1$ on the basis of camera images, it takes the camera and/or the associated arithmetic unit some time to determine the subsequent, current relative-velocity value. During this dead time or oversleep time, the previously determined relative-velocity value may be corrected one or more times by the first arithmetic unit of the inventive device, wherein this correction may be based on current data of the acceleration sensor in each case. In particular, the acceleration sensor may transmit, with a predetermined clocking, current proper-acceleration values a of the vehicle to the first arithmetic unit within this dead time so that the vehicle may be supplied with corrected relative-velocity values in the time period between a first determination and a second determination of the relative velocity of the vehicle solely based on camera images.

According to a further exemplary embodiment of the invention, the device has a camera and a second arithmetic unit. The camera is designed to generate images of a surroundings of the vehicle. The second arithmetic unit is designed to determine the distance value of the vehicle relative to the object and/or the relative-velocity value $v_1$ of the vehicle relative to the object on the basis of the generated images of the camera. A time $t_2$ is required for image generation by the camera and for the determination of the distance value and/or of the relative-velocity value by the second arithmetic unit, wherein time period $t_1$ is selected such that $t_1$ is smaller than $t_2$.

In this context, the first and second arithmetic units may be designed as one and the same arithmetic unit. In particular, the determination of the values and correction are performed in the same arithmetic unit. This arithmetic unit may be arranged within the camera, within the acceleration sensor, or outside the camera and outside the acceleration sensor. For example, this second arithmetic unit may also be part of the passive safety system or designed as a separate structural unit, wherein, in an exemplary embodiment, the required time period $t_2$ may be the time from the beginning of a first determination of relative velocity based on first images to the complete second determination of a second relative-velocity value based on second images. In other words, the camera calculates, in this exemplary embodiment, the distances and relative velocities in a time period that is longer than required for a faster decision process in the vehicle. An example of such a faster decision process is the actuating decision in a passive safety system that actuates passive restraint means.

According to a further exemplary embodiment of the invention, the first arithmetic unit is designed to perform the correction of the relative-velocity value only if the measuring delay $t_2$ of the camera when determining the relative velocity of the vehicle exceeds a stored time threshold value $t_{SW}$.

According to a further exemplary embodiment of the invention, the device has a storage unit, in which a threshold value $a_{SW}$ of the proper acceleration of the vehicle is stored. The first arithmetic unit is designed to compare the measured proper-acceleration value a with the threshold value $a_{SW}$ stored in the vehicle and to correct the distance value and/or the relative-velocity value $v_1$ only if an amount of the measured proper acceleration a is greater than an amount of the stored threshold value $a_{SW}$.

In other words, the uncorrected camera-based relative-velocity value is used in principle in this exemplary embodiment. Only in extreme situations in which the vehicle exhibits a particularly high acceleration or a particularly high deceleration, the inventive correction is performed in the first arithmetic unit. For example, correction may be performed only if acceleration is greater than a value b1 or deceleration is smaller than a value −b1. The storage unit may be, e.g., an electronic storage unit, a memory chip, or a hard drive.

According to a further exemplary embodiment of the invention, the device has the acceleration sensor, which is designed as a longitudinal-acceleration sensor and adapted to measure a longitudinal-acceleration value a of the vehicle. In other words, a longitudinally measuring acceleration sensor is used in this exemplary embodiment.

According to a further exemplary embodiment of the invention, a vehicle having a device for correcting a distance value and/or for correcting a relative-velocity value for the vehicle according to any one of the preceding or hereinafter described exemplary embodiments is specified. Therefore, the vehicle may have, e.g., the camera, the acceleration sensor and the first arithmetic unit and, in some exemplary embodiments, also the second arithmetic unit.

According to a further exemplary embodiment of the invention, the vehicle has a passive safety system. The passive safety system is designed to actuate at least one component selected from the group consisting of a seat belt tensioner, an airbag, a restraint system, a passive restraint means, and an active hood. The passive safety system is designed to use the distance value corrected by the first arithmetic unit and/or the relative-velocity value corrected by the first arithmetic unit to actuate one of the components.

In other words, the advantageous device of the present invention is used to actuate passive restraint means. To this end, the corrected distance value and/or the corrected relative-velocity value may be transmitted from the first arithmetic unit to the passive safety system by wired or wireless communication. In some exemplary embodiments, the first arithmetic unit, which performs correction, is part of this passive safety system. To this end, the passive safety system may be designed to calculate a velocity of the impact of the vehicle on the object at a corresponding moment of impact, wherein the corrected relative velocity is used for this purpose.

According to a further exemplary embodiment of the invention, a method for correcting a distance value and/or a relative-velocity value of a vehicle is specified. The method has the step of providing a distance value of the vehicle relative to an object present in a surroundings of the vehicle and/or a relative-velocity value $v_1$ of the vehicle relative to said object, said distance value and said relative-velocity value $v_1$ being determined on the basis of camera images. In the method, a proper-acceleration value a of the vehicle is measured by an acceleration sensor and this value a is provided by the acceleration sensor. For example, this value is provided by the acceleration sensor of the first arithmetic unit as explained above. In a further step, a correction of the distance value and/or a correction of the relative-velocity value $v_1$ are/is performed, wherein the correction of the distance value and/or the correction of the relative-velocity value $v_1$ are/is performed depending on the proper-acceleration value a of the vehicle.

According to the specified method, the determined values based on the first camera measurement are advantageously represented more precisely by using the values of the acceleration sensor to correct the determined values, whereby, due to the comparatively long break required between two camera measurements, a more precise distance value and/or a more precise relative-velocity value may be provided in the vehicle within this time period. For example, the time period between two vehicle camera measurements may be assumed to be 250 ms. However, other minimum dead times of such systems also occur in reality.

In other words, a correction of a slowly repeated camera-based measurement of the distance/measurement of relative velocity with respect to an object with the aid of an internal acceleration signal sampled at a much higher rate is thus provided. In particular, the acceleration signal may be a longitudinal acceleration signal of the vehicle.

According to a further exemplary embodiment of the invention, the generation of images of the surroundings of the vehicle by means of the vehicle camera is specified. A further step of the method is the determination of the distance value and/or of the relative-velocity value $v_1$ on the basis of the generated images of the vehicle camera. Measuring the proper-acceleration value a of the vehicle by means of an acceleration sensor of the vehicle is also part of the method.

According to a further exemplary embodiment of the invention, a distance of the vehicle to the object is estimated on the basis of at least two camera images. A further step is the calculation of the relative velocity of the vehicle relative to the object by dividing the estimated distance by a time difference between the corresponding camera images.

According to a further exemplary embodiment of the invention, the use of camera-based distance values/relative-velocity values in a vehicle corrected by means of a measured proper-acceleration value of the vehicle is specified.

According to a further exemplary embodiment of the invention, a program item is specified, which, when it is executed on a processor, instructs the processor to carry out a method described in the context of the present invention. The program item may be part of a computer program. Furthermore, the program item itself may be an independent computer program. For example, the program item may enable, as an update, an already existing computer program to carry out the inventive method.

According to a further exemplary embodiment of the invention, a computer-readable medium is specified, on which a program item is stored, which, when it is executed on a processor, instructs the processor to carry out a method described in the context of the present invention. The computer-readable medium may be considered as a storage medium, e.g., a USB flash drive, a CD, a DVD, a hard drive, or another storage medium. Furthermore, the computer-readable medium may also be designed as a microchip that enables a passive safety system to carry out the inventive method.

Further advantages, features and applications of the invention can be inferred from the following description of the exemplary embodiments and figures, wherein all described and/or depicted features constitute, individually and in any combination thereof, the subject matter of the invention, even independently of their composition in the individual claims or the references thereof.

BRIEF DESCRIPTION OF THE DRAWINGS

The figures are shown schematically and not true to scale. When the same or similar reference numerals are used in different figures in the following description, they denote the same or similar elements.

DETAILED DESCRIPTION OF THE PREFERRED EMBODIMENTS

Figure 1:
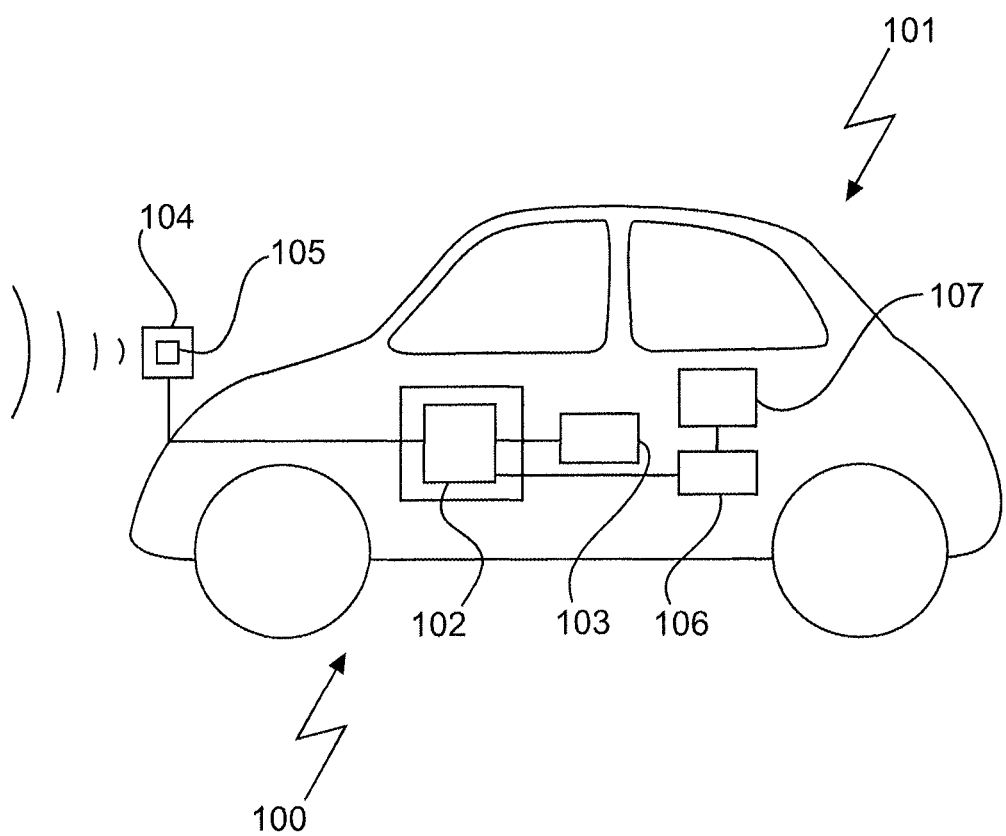
FIG. 1 shows a vehicle having a device for correcting a distance value and/or for correcting a relative-velocity value according to an exemplary embodiment of the invention.

FIG. 1 shows a vehicle 101 having a device 100 for correcting a distance value and/or for correcting a relative-velocity value for the vehicle 101. The device 100 has a first arithmetic unit 102. An acceleration sensor 103 measuring proper-acceleration values a of the vehicle is also present in the vehicle 101, said acceleration sensor 103 performing said measurements in a continuous or clocked manner. The vehicle 101 also has a camera 104 generating images of the surroundings of the vehicle. The second arithmetic unit 105 is arranged within the camera 104. The second arithmetic unit is designed to determine the (within the meaning of the invention) uncorrected distance value of the vehicle relative to an object and/or the uncorrected relative-velocity value $v_1$ of the vehicle relative to the object on the basis of the generated images of the camera. This distance value and/or relative-velocity value of the vehicle determined by camera images is transmitted to the device 100. The first arithmetic unit 102 of the device 100 is designed to correct the distance value and/or relative-velocity value transmitted by the second arithmetic unit. In particular, the arithmetic unit 102 is designed to perform this correction depending on a proper-acceleration value a of the vehicle 101 measured by the acceleration sensor 103. The inventive correction of relative velocity can realize safety-relevant advantages for the user of the vehicle 101 particularly in time periods between a first determination of relative velocity and a second determination of relative velocity in the second arithmetic unit 105. In particular, the device 100 may transmit the corrected value/s to a passive safety system 106 of the vehicle. The passive safety system 106 can actuate the component 107 on the basis of the corrected values of the distance and/or of the relative velocity of the vehicle. The component 107 may be designed, e.g., as a seat belt tensioner, an airbag, a restraint system, a pedestrian airbag, a passive restraint means, and an active hood. The passive safety system 106 is designed to use the corrected values or the corrected value to actuate one of the components, i.e., the corrected values determined by the first arithmetic unit are directly used for an actuating decision.

By means of the device 100, an increase in the precision of the distance and/or the relative velocity of a camera-based sensor with the aid of longitudinal acceleration for use in passive safety systems is provided, wherein the acceleration sensor 103 may be designed, e.g., as a longitudinal-acceleration sensor whose data are used, for a short time, to correct the data of the sluggish camera-based detection system, wherein correction may be performed for a time period in which a too sluggish reaction of the determination by the camera 104 with the second arithmetic unit 105 is to be expected. This time period may depend on the technical realization of the camera system and may have different lengths. With the aid of the acceleration signal of the acceleration sensor 103, which can be sampled at a higher rate, a further corrected distance value and/or relative-velocity value is generated by the first arithmetic unit 102 that may then be used instead of the raw data of the slow, camera-based system in the passive safety system 106, e.g., to predict accident severity, the moment of impact, and impact velocity. For example, the device 100 may use the motion equation to anticipate the future motion of the vehicle that can be estimated by means of the currently measured acceleration of the vehicle.

Figure 2:
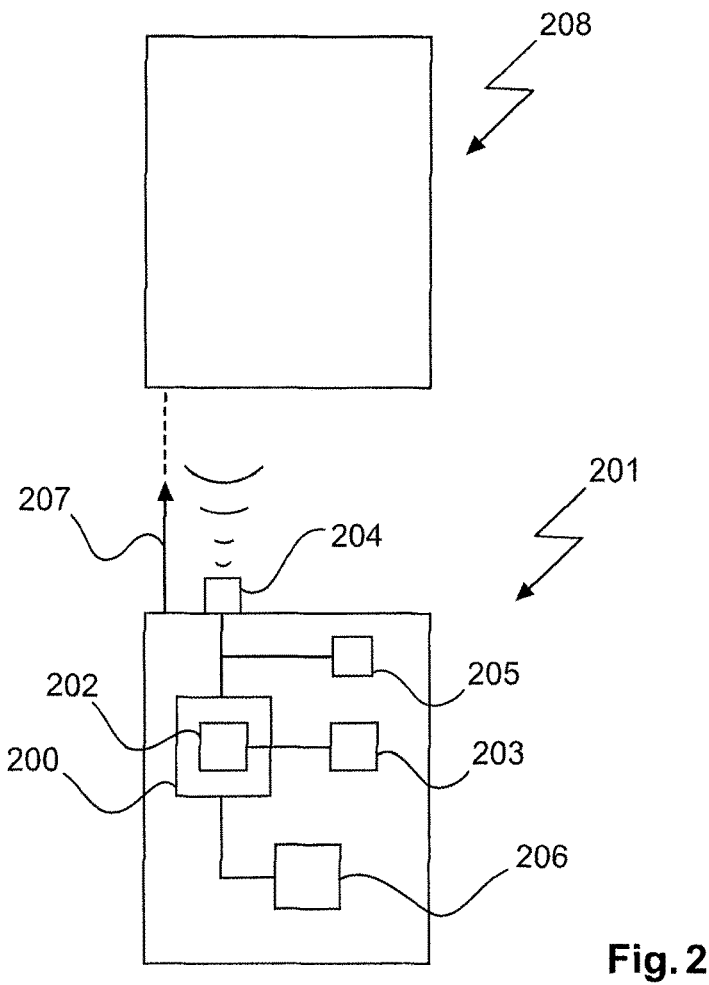
FIG. 2 shows a vehicle having a device for inventive correction according to an exemplary embodiment of the invention.

According to a further exemplary embodiment of the invention, FIG. 2 shows a vehicle 201 having an inventive device 200, in which the first arithmetic unit 202 is arranged. The vehicle 201 also has a camera 204 generating images for determining the distance value and/or the relative-velocity value of the vehicle. These values are determined in the separately arranged second arithmetic unit 205. The vehicle 201 also has a longitudinal-acceleration sensor 203 measuring the longitudinal acceleration of the vehicle 201, wherein relative velocity is symbolically indicated by arrow 207 in FIG. 2. Furthermore, a second vehicle 208 is symbolically shown as an object present in the surroundings of the vehicle 201. Furthermore, a system 206, to which the device 200 transmits the corrected values, is shown. For example, this system 206 is designed as a passive safety system, but other exemplary embodiments of the system 206 are also possible. In the vehicle 201, the camera 204 generates an image of a surroundings of the vehicle. In the second arithmetic unit 205, the distance value of the vehicle relative to the second vehicle 208 and, on the basis thereof, the relative velocity $v_1$ 207 of the vehicle relative to the second vehicle 208 are determined. The longitudinal-acceleration sensor 203 has measured the proper acceleration a of the vehicle and transmitted this value to the first arithmetic unit 202. This first arithmetic unit corrects the previously determined distance value and/or the previously determined relative-velocity value by means of the proper acceleration of the vehicle measured by the acceleration sensor, whereby a corrected distance value and/or a corrected relative-velocity value are/is generated by the first arithmetic unit 202, wherein the first arithmetic unit calculates a velocity value $v_2$ in the form of a time integral from t=0 to $t_1$ of the measured proper-acceleration value a. Subsequently, these generated values may be used for further purposes, particularly for the actuating decision of components of the passive safety system. In this manner, an essentially improved prediction of impact velocity and of the moment of impact to be expected is achieved at least for accidents with stationary or non-accelerated targets. In particular, such a prediction of impact velocity and a prediction of the moment of impact to be expected can be calculated on the basis of the corrected values in the vehicle, which may be performed, e.g., in the first arithmetic unit 202.

Figure 3:
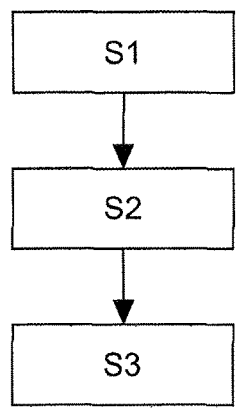
FIG. 3 shows a flow chart of a method according to an exemplary embodiment of the invention.

According to a further exemplary embodiment of the invention, FIG. 3 shows a flow chart of a method for correcting a distance value and/or a relative-velocity value of a vehicle. In step S1, a distance value of the vehicle relative to an object present in a surroundings of the vehicle and/or a relative-velocity value $v_1$ of the vehicle relative to said object are/is provided, said distance value and said relative-velocity value $v_1$ being determined on the basis of camera images. A proper-acceleration value a of the vehicle measured by an acceleration sensor is also provided (in step S2 of FIG. 3). In step S3, a correction of the previously provided distance value and/or a correction of the previously provided relative-velocity value $v_1$ are/is performed, wherein the correction of the distance value/of the relative-velocity value $v_1$ is performed depending on the proper-acceleration value a of the vehicle.

Thus, this method uses the motion equation to anticipate the future motion of the vehicle that can be estimated by means of the currently measured acceleration of the vehicle.

According to a further exemplary embodiment, the method according to FIG. 3 includes the additional step of calculating a velocity of the impact of the vehicle on the object at a corresponding moment of impact. The corrected distance value and/or the corrected relative-velocity value are/is used to calculate impact velocity and the moment of impact.

In a further specified exemplary embodiment, the additional step of using the corrected distance value and/or the corrected relative-velocity value to actuate a component of the vehicle is added to the method according to FIG. 3 or to the previously mentioned method. This component may be, e.g., a seat belt tensioner, an airbag, a restraint system, a passive restraint means, a pedestrian airbag, and/or an active hood.

According to a further exemplary embodiment, the method includes the additional step of estimating a distance of the vehicle to the object on the basis of at least two camera images. Furthermore, the step of calculating the relative velocity of the vehicle relative to the object by dividing the estimated distance by a time difference between the corresponding camera images is included.

In addition, it should be noted that "comprising" does not exclude any other elements or steps and "a" does not exclude a plurality. Furthermore, it should be noted that features or steps described with reference to one of the above exemplary embodiments may also be used in combination with other features or steps of other exemplary embodiments described above. Reference numerals in the claims are not to be considered as being restrictive.

The invention claimed is:

1. A device for correcting a distance value and/or for correcting a relative-velocity value for a vehicle, the device comprising:
    a first arithmetic processor of the vehicle configured to:
        correct a distance value of the vehicle relative to an object present in a surroundings of the vehicle and/or to correct a relative-velocity value $v_1$ of the vehicle relative to the object:
            1) by determining the corrected distance value and/or the corrected relative-velocity value $v_1$ from camera images captured by a camera of the vehicle only when a time period during which the distance value and/or the relative-velocity value $v_1$ are to be corrected is greater than or equal to a time period required to perform the correction by the camera images, and
            2) by determining the corrected distance value and/or the corrected relative-velocity value $v_1$ from a proper-acceleration value a of the vehicle measured by an acceleration sensor only when the time period during which the distance value and/or the relative-velocity value $v_1$ are to be corrected is less than the period required to perform the correction by the camera images, and
        control a physical system of the vehicle based on the corrected distance value and/or the corrected relative-velocity value $v_1$.

2. The device according to claim 1,
    wherein the first arithmetic processor is designed to calculate a velocity value $v_2$ in the form of a time integral from t=0 to $t_1$ of the measured proper-acceleration value a, according to the formula:

$$\int_0^1 a\,dt.$$

3. The device according to claim 2,
wherein the first arithmetic processor is designed to generate a corrected distance value and/or to generate a corrected relative-velocity value $v_3$,
wherein $v_3 = v_1 - v_2$ for the corrected relative-velocity value $v_3$ generated by the first arithmetic processor if the measured proper-acceleration value a is negative and thus represents a deceleration, and
wherein $v_3 = v_1 + v_2$ for the corrected relative-velocity value $v_3$ generated by the first arithmetic processor if the measured proper-acceleration value a is positive.

4. The device according to claim 1, further comprising:
a storage unit,
wherein a threshold value $a_{SW}$ of the proper acceleration of the vehicle is stored in the storage unit, and
wherein the first arithmetic processor is designed to compare the measured proper-acceleration value a with the threshold value $a_{SW}$ stored in the vehicle and to correct the distance value and/or the relative-velocity value $v_1$ only if an amount of the measured proper acceleration a is greater than an amount of the stored threshold value $a_{SW}$.

5. The device according to claim 1,
wherein the acceleration sensor is a longitudinal-acceleration sensor adapted to measure a longitudinal-acceleration value a of the vehicle.

6. A vehicle having a device for correcting a distance value and/or for correcting a relative-velocity value for the vehicle according to claim 1.

7. The vehicle according to claim 6, said vehicle further comprising:
a passive safety system,
wherein the passive safety system is designed to actuate at least one component selected from the group consisting of a seat belt tensioner, an airbag, a pedestrian airbag, a restraint system, a passive restraint means, and an active hood, and
wherein the passive safety system is designed to use the distance value corrected by the first arithmetic processor and/or the relative-velocity value corrected by the first arithmetic processor to actuate one of the components.

8. A method for correcting a distance value and/or a relative-velocity value of a vehicle, said method comprising:
providing, by an arithmetic processor of the vehicle, a distance value of the vehicle relative to an object present in a surroundings of the vehicle and/or a relative-velocity value $v_1$ of the vehicle relative to said object, said distance value and said relative-velocity value $v_1$ being determined on the basis of images from a camera,
providing, by the arithmetic processor of the vehicle, a proper-acceleration value a of the vehicle measured by an acceleration sensor, and
performing, by the arithmetic processor of the vehicle, a correction of the distance value and/or performing a correction of the relative-velocity value $v_1$ relative to the object:
1) by determining the corrected distance value and/or the corrected relative-velocity value $v_1$ from the images captured by the camera of the vehicle only when a time period during which the distance value and/or the relative-velocity value $v_1$ are to be corrected is greater than or equal to a time period required to perform the correction by the camera images, and
2) by determining the corrected distance value and/or the corrected relative-velocity value $v_1$ from a proper-acceleration value of the vehicle measured by the acceleration sensor only when the time period during which the distance value and/or the relative-velocity value $v_1$ are to be corrected is less than the period required to perform the correction by the camera images, and
controlling a physical system of the vehicle based on the corrected distance value and/or the corrected relative-velocity value $v_1$.

9. The method according to claim 8, said method further comprising:
calculating a velocity of an impact of the vehicle on the object at a corresponding moment of impact, and
wherein the corrected distance value and/or the corrected relative-velocity value are/is used to calculate impact velocity and the moment of impact.

10. The method according to claim 8, said method further comprising:
using the corrected distance value and/or the corrected relative-velocity value to actuate a component of the vehicle selected from the group consisting of a seat belt tensioner, an airbag, a restraint system, a passive restraint means, and an active hood.

11. The device according to claim 3,
wherein time $t_1$ is selected such that $t_1$ is smaller than a delay time required by the determination of the distance value and/or of the relative-velocity value $v_1$ by the camera images.

12. The method according to claim 9, said method further comprising:
using the corrected distance value and/or the corrected relative-velocity value to actuate a component of the vehicle selected from the group consisting of a seat belt tensioner, an airbag, a restraint system, a passive restraint means, and an active hood.

13. The device according to claim 2,
wherein time $t_1$ is selected such that $t_1$ is smaller than a delay time required for the determination of the distance value and/or of the relative-velocity value $v_1$ by the camera images.

14. The device according to claim 2, further comprising:
a camera, and
a second arithmetic processor,
wherein the camera is designed to generate images of the surroundings of the vehicle,
wherein the second arithmetic processor is designed to determine the distance value of the vehicle relative to the object and/or the relative-velocity value $v_1$ of the vehicle relative to the object on the basis of the generated images of the camera, and
wherein a time $t_2$ is required for image generation by the camera and for the determination of the distance value and/or of the relative-velocity value by the second arithmetic processor, and
wherein $t_1$ is selected such that $t_1$ is smaller than $t_2$.

15. The device according to claim 3, further comprising:
a second arithmetic processor,
wherein the camera obtains images of the surroundings of the vehicle,
wherein the second arithmetic processor is designed to determine the distance value of the vehicle relative to the object and/or the relative-velocity value $v_1$ of the vehicle relative to the object on the basis of the generated images of the camera, and wherein a time $t_2$ is required for obtaining images by the camera and for the determination of the distance value and/or of the relative-velocity value by the second arithmetic processor, and wherein $t_1$ is selected such that $t_1$ is smaller than $t_2$.

* * * * *